US005525408A

United States Patent [19]

Weir et al.

[11] Patent Number: 5,525,408

[45] Date of Patent: Jun. 11, 1996

[54] RADIATION - SHIELDING MATERIAL

[76] Inventors: Donald Weir, 15 Archery Rise, Nevilles Cross; John T. Hare, 70 High Burn, Stonelaw Grange, Cramlington, both of United Kingdom

[21] Appl. No.: 320,575

[22] Filed: Oct. 11, 1994

[30] Foreign Application Priority Data

Oct. 13, 1993 [GB] United Kingdom .................. 9321170

[51] Int. Cl.[6] ........................................ B32B 7/00

[52] U.S. Cl. .......................... 428/220; 428/213; 428/328; 428/332; 428/447; 428/448; 428/450; 428/451; 428/68; 428/76; 250/515.1; 250/519.1; 376/287

[58] Field of Search .................................. 428/323, 328, 428/332, 447, 448, 450, 451, 213, 68, 76, 220; 250/519.1, 515.1; 376/287, 288

[56] References Cited

U.S. PATENT DOCUMENTS

| | | | |
|---|---|---|---|
| 3,622,432 | 11/1971 | McCluer et al. | 161/87 |
| 3,883,749 | 5/1975 | Whittaker et al. | 250/516 |
| 4,203,886 | 5/1980 | Hirai et al. . | |
| 4,938,233 | 7/1990 | Orrison, Jr. | 128/849 |
| 5,001,354 | 3/1991 | Gould et al. | 250/516.1 |
| 5,059,807 | 10/1991 | Kersten et al. | 250/519.1 |
| 5,219,650 | 6/1993 | Ritter | 428/323 |
| 5,245,195 | 9/1993 | Shah et al. | 250/515.1 |

FOREIGN PATENT DOCUMENTS

| | | |
|---|---|---|
| 878465 | 9/1061 | United Kingdom . |
| 851479 | 10/1960 | United Kingdom . |
| 887956 | 1/1962 | United Kingdom . |
| 954594 | 4/1964 | United Kingdom . |
| 1122766 | 8/1968 | United Kingdom . |
| 1596607 | 8/1981 | United Kingdom . |
| 2118410 | 9/1985 | United Kingdom . |

*Primary Examiner*—Patrick J. Ryan
*Assistant Examiner*—Marie R. Yamnitzky
*Attorney, Agent, or Firm*—Marshall, O'Toole, Gerstein, Murray & Borun

[57] ABSTRACT

A radiation shielding element especially for use in the temporary shielding of ancillary equipment or apparatus in nuclear-powered steam raising installations, said element comprising a flexible radiation-shielding sheet laminate comprising a flexible inner layer of plastic material, preferably silicone, filled with particles of radiation shielding material such as lead, said layer being interposed between two flexible skins of silicone elastomer.

10 Claims, No Drawings

RADIATION - SHIELDING MATERIAL

This invention relates to radiation shielding material primarily intended for shielding sources of high energy shortwave electromagnetic radiation, in particular shortwave X-rays such as gamma rays such as are found in association with nuclear-powered steam raising installations and the like.

In such installations, ancillary equipment and apparatus such as valves, pumps and pipes of the steam generating circuit, located in areas to which human access may be required, e.g. for routine maintenance, overhaul and repairs, can become contaminated with high energy radiation such as gamma radiation (including beta-gamma radiation) and it is therefore desirable to provide shielding to protect the operatives who have to enter and work in it.

One method of achieving such temporary shielding is by the use of sheets or tiles of radiation-shielding material which are hung over or wrapped round the equipment from which operatives are to be protected or which are formed into temporary housings round the equipment e.g. by hanging sheets from overhead fixings.

In many instances, the equipment is in a confined space and/or in a location which can only be approached with difficulty through tortuous routes and it is therefore necessary for the tiles or sheets to be flexible so that for example, they can be manoeuvred round sharp corners or down narrow passages and/or wrapped round equipment such as pipes.

While lead is well known to be an excellent shield against such radiation, it is unsuitable for such purposes because it is too heavy and insufficiently flexible; moreover if the sheets become contaminated, they have to be disposed of, which is expensive. Thus, attention has focused on elastomeric or rubbery plastics materials filled with radiation-shielding particles, e.g. of lead. However, it has been found that if sufficient particles are incorporated to achieve the required shielding, the product is frequently not strong enough to support its own weight and also tends to tear or split when it is flexed. On the other hand, if the mount of particles is adjusted so as to obtain a product which is self supporting and/or has adequate flexibility, its shielding capability is inadequate or is only adequate if the material is used in a thickness which creates problems due to its bulk and also restricts the ability of the material to flex. Moreover, where as is generally the case, the radiation-shielding particles are metallic, placing these materials in contact against metallic components of the equipment to be shielded is not recommended because of the risk of electrolytic action between the particles and the component, especially in the presence of water vapor, moisture or steam.

In an attempt to overcome the problem of inadequate strength in the highly filled plastic sheets, there have been many proposals for laminating lead-filled plastic materials between protective sheets such as of plastic impregnated cloth, e.g. for use in hospitals for protection against X-rays; see, for example, GB-A-851479, 954594, 1122776 and 2118410. However, these materials are not suitable for the applications with which the present invention is especially concerned, particularly the temporary shielding of ancillary equipment and apparatus in nuclear installations. One reason for this is that much of the equipment in nuclear installations which is to be shielded is made of stainless steel and there are severe restraints on what materials may be brought into contact therewith. For example, materials such as PVC or rubber which are likely to yield halide or sulphide ions are generally considered unsuitable. Another reason is that because the equipment to be shielded is frequently in confined spaces, inflammable materials or materials such as polyurethane or polyamides which are likely to yield toxic fumes if burned are also banned. Thus, for these and other reasons, such laminates have not proved acceptable to any significant degree in practice and the art has sought alternative solutions.

One solution which is in use is to employ tiles or sheets of lead-filled plastic in protective plastic bags. However, this, too, has not proved entirely satisfactory. Firstly, the tiles or sheets themselves are not very flexible and cannot easily be wrapped round pipes when in their bags, and if they are hung over the pipes it is necessary, in order to ensure that the laminate does not accidentally slip off, for the length of laminate hanging down each side of the pipe to be not much less than the length of laminate extending along the pipe. Secondly, when the bags are hung vertically, the sheets tend to slump inside, thus reducing the protection. Counteracting this effect requires the use of more layers or thicker sheets, thus still further increasing both bulk and weight, and further exacerbating the problem. Thirdly, the bags can collect water and must then be disposed of because of the risk of contamination if there is a steam or water leak. Fourthly, the most suitable material found for the bags is PVC which is a potential source of chloride ions.

The present invention aims to reduce or obviate these problems.

According to the present invention, there is provided a radiation-shielding element comprising a flexible radiation-shielding dense sheet laminate comprising a flexible inner layer of plastic material filled with particles of radiation shielding material such as lead, said layer being interposed between two flexible skins of silicone elastomer. A preferred class of silicone for the flexible outer skins is that used for the production of molds.

It is to be understood that the term sheet, as used herein, also covers small elements such as tiles and elongated elements such as strips, as well as sheet products.

The laminate is flexible and, with suitable choice of the plastic material for the inner layer and within the preferred thickness range of 5 to 20 mm, may readily be twisted or bent for transfer along tortuous routes and curved to conform with the external profiles of pipes and the like even pipes having diameters of 25 mm or less.

Moreover, it has been found that silicone elastomers with the desired physical properties are readily available which are free or substantially free of components capable of yielding unacceptable ions such as halide or sulphide; in particular, the Content of each of fluoride, chloride and sulfide is less, and generally substantially less, than 200 mg/kg. Thus, the laminates can be placed in direct contact with the equipment to be shielded and the use of a protective bag is not required. This, in combination with the flexibility of the laminate, reduces the space required to achieve the desired protection against radiation, a factor which is important where the equipment is in a confined space. Further, any moisture which collects on the surface of the laminate is readily removable by wiping, particularly where the silicone is chosen to be hydrophobic, thus rendering decontamination simple.

Another advantage for the laminates of the present invention is obtained if a silicone material which exhibits surface tackiness is employed since this reduces the risk of the laminate slipping where, for example, it is hung over a pipe. In fact, it has been found that laminates of the invention may safely be laid over a pipe with the long axis of the laminate parallel to the pipe axis even at length/width ratios for the laminate of 3:1 or more.

With suitable choice of the plastic material for the inner layer, the laminates of the invention are remarkably tough and resilient; for example laminates of the invention which are as much as 9 mm thick may be bent round a radius as small as 12–13 mm without tearing or splitting. They are also resistant to damage from knocks, unaffected by moisture, able to tolerate temperatures in and beyond the range likely to be encountered in normal use, and do not yield toxic or noxious fumes on combustion.

In a preferred embodiment, some or all of the edges of the laminate are clad with silicone so that the filled plastic layer is encapsulated.

While any plastic material may be employed for the filled plastics layer provided that it is compatible with and bonds well to the silicone polymer of the outer, i.e. skin layers and the layer has the desired flexibility, it is preferred that this, too, is silicone elastomer since this avoids any problems of incompatibility between this layer and the skin layers, and ensures a strong bond between them. Other materials that may be employed include polyolefins, polyamides, polyesters, vinyl polymers, polyurethanes, and the like.

While any material known to be an efficient absorber of high energy shortwave electromagnetic radiation, and in particular gamma rays, may be used for the particles with which the inner layer is filled provided the particles can be incorporated in the plastic material of the inner layer and do not adversely affect it, e.g. are inert to it, the preferred material is lead. Other suitable materials will be known to those skilled in the art. In general, it will be preferred to include as high a proportion of the particles of radiation shielding material in the inner layer as possible consistent with achieving the desired flexibility and obtaining a coherent sheet. In general, however, the limiting factor is the volume of particles that can be mixed into the resin. For lead particles and silicone elastomer, a preferred concentration of the particles is in the range 50 to 95% by weight, more preferably 75 to 95% based on total weight of lead particles and resin. Below 50%, the protection is poor and above 95% there is difficulty in incorporating the particles into the resin. Other radiation-shielding materials and/or other polymeric materials may lead to different ranges of optimum concentration but these can readily be determined by simple experiment.

It will be understood that the radiation-shielding efficiency of the laminate will depend inter alia on the concentration of radiation-shielding particles in the inner layer of the laminate and the thickness of that layer. On the other hand, the flexibility of the laminate will tend to decrease with increase in its overall thickness. Also, increase in thicknesses of the inner layer relative to the sum of the thickness of the two skin layers will increase the radiation-shielding efficiency expressed as a function of thickness. It is therefore desirable for the thickness of the skin layers to be as small as possible commensurate with providing the desired properties in the laminate. In general, we have found that thicknesses as small as 1 to 2 mm are adequate for the skin layers and even thinner layers may be satisfactory in some cases. Of course, thicker layers may also be used but little additional advantage is likely to be gained thereby.

The overall thickness of the laminates is controlled by the desired level of radiation protection on the one hand and weight and flexibility on the other. Preferred thicknesses are in the range 5 to 20 mm, more preferably 8 to 16 mm. It will be understood that in some circumstances, such as shielding of small diameter pipes, the desired protection is best achieved by employing several layers of a thin laminate, e.g. by winding a strip of the laminate round the pipe two or more times, rather than one layer of thicker laminate.

Preferred lengths and widths for the sheets of the invention are length: 30cm to 120cm, more preferably 60 to 100cm.

width: 15cm to 50cm, more preferably 20 to 35cm.

This is not to say, however, that dimensions outside these ranges may not be found acceptable in special circumstances. If a laminate is not sufficiently thick to provide the desired level of protection, this may be resolved by using two or more layers of laminate. In this case, lateral locations of the sheets of one layer should be staggered relative to those of the next layer so that the spaces between adjacent sheets of the first layer are covered by sheets of the next layer.

The laminates of the invention may be formed by depositing a layer of silicone elastomer to the desired thickness in a suitably shaped mould to provide the first skin layer and then causing or allowing it to partially cure so that it is no longer fluid but still noticeably tacky. A preformed inner layer or the composition to form the inner layer may then be deposited on this first layer. In a preferred embodiment, this composition is obtained by mixing the radiation-shielding particles with a liquid curable elastomeric resin material, e.g. silicone elastomer, pouring the mixture into the mold to the desired thickness and causing or allowing it to partially cure so that it is no longer fluid but still noticeably tacky. Thereafter, a further layer of silicone elastomer is deposited to the desired thickness to provide the second skin layer and the whole is cured. The laminate may then be removed from the mould. The partial curing steps and the final curing may be accelerated by heating.

Where it is desired to encapsulate the inner layer of filled plastic material, the side walls of the mould may be coated with silicone elastomer prior to depositing the three layers or after depositing the first layer and before depositing the second and third layers. Alternatively the edges of the laminate may be coated with silicone elastomer composition after the laminate has been removed from the mold.

If desired, one or more other layers may be included in the laminate, e.g. to extend the protection afforded by the laminate and/or to modify its physical and/or surface properties.

Fillers and/or other additives other than the radiation-shielding particles may be included in the inner layer, if desired, and one or both of the outer silicone layers may include fillers or other additives, e.g. pigments. It may even be acceptable to include small quantities of radiation-shielding particles in one or both of the outer layers; however this is not advisable where the layer is intended to come into contact with the equipment it is shielding where that equipment is metallic, especially stainless steel.

Reinforcement, e.g. in the form of fibrous material, e.g. carbon or glass fibre, may be included in the laminate e.g. as chopped fibres, rovings or woven or unwoven webs.

While the laminates of the invention have been developed primarily to solve the problems of finding an acceptable radiation screening material for high energy shortwave electromagnetic radiation such as gamma rays which typically have a quantum energy of at least 0.3 MeV and more particularly at least 1 MeV, and especially for the temporary screening of ancillary plant and apparatus of nuclear powered installations such as for steam raising in order to protect operatives from exposure to such radiation, they may also find use in other applications where the same or similar radiation emissions are encountered, e.g. as in hospitals, medical research and experimental laboratories. They may also find application in providing shielding for lower energy longer wavelength X-rays, e.g. having a quantum energy somewhat below 1MeV, for example in the range 1 keV–1 MeV and/or having a wavelength somewhat greater than 0.1 or 1 Å, e.g. up to 10 Å or 100 Å.

The invention is now illustrated by the following Example

EXAMPLE 357.3 g of the base component of the silicone elastomer system marketed by Dow Corning as Silastic E, 3.9 g of yellow pigment (WS 15414A from West and Senior Limited of Manchester England), and 35.7 g of curing agent for the base were mixed together and poured into a 914.4 mm ×30.5 mm ×9 mm high mold to form a layer about 1.25 mm thick and partially cured by heating.

The side walls of the mold were then coated with a pre-mixed thixotropic composition of 26.5 g of the same silicone base, 0.3 g of the pigment, 2.7 g of the curing agent and 0.5 g of amorphous silica and this coating was then heated to partially cure it.

The composition for the inner layer was formed by mixing together 914.4 g of the silicone base, 91.4 g of the curing agent and 8097.2 g of 80–200 mesh lead particles and this composition was poured on to the partially cured first layer in the mold and heated to achieve partial cure.

Finally, a top layer was formed from an identical composition to that of the bottom layer and any excess was removed by doctor knife. The whole laminate was then heated to cure the top layer and complete the cure of the inner layer, bottom layer and side layers.

The 9 mm thick laminate so obtained could readily be wrapped round a 25.4 mm diameter pipe without any sign of tearing or splitting and could support its own weight. The faces of the laminate were slightly tacky which enabled it to be draped over pipes and other equipment with a reduced risk of slipping.

The attenuation of the laminate was measured using an iridium 192 isotope and found to be equivalent to about 5 mm of lead; however, the weight of the laminate is substantially less than the weight of a corresponding sheet made from 5 mm lead. Using an RO2 radiation dose meter with a 37GBq Cs 137 source, the attenuation at a dose rate of 370 micro Sv/hr was found to be 28.3%. The attenuation of a collimated Co 60 source of mean energy 1.25 MeV was measured at 21% at dose rates of 500 $\mu Gyh^{-1}$ and 50$\mu Gyh^{-1}$.

A sample of the outer skin of the laminate was analysed for fluorine, chlorine and sulphur and found to contain 67.7, 24.05 and 73.3 mg/kg, respectively. The nitrogen content of the molding was negligible.

In similar manner, and using the same quantities of materials for the outer layer and side wall coating but a proportionately larger quantity of material for the inner layer, a 15 mm thick tile was obtained.

While, in the above Examples, a thixotropic composition was used to coat the sides of the mold, it has been found that the thixotropic agent may be omitted.

We claim:

1. A radiation-shielding element for shielding against γ-rays and X-rays having a wavelength not greater than about 0.1 Å, said element comprising a dense self-supporting flexible sheet laminate which is about 5 mm to about 20 mm thick and comprises a flexible inner layer of plastic material filled with particles of material capable of shielding against radiation having a wavelength of about 0.1 Å or less, said particles forming at least about 50% by weight of said inner layer, said inner layer being interposed between two flexible skins comprising silicone elastomer, said skins forming the outermost layer of the laminate and each being 2 mm or less thick, the respective compositions of the inner layer and the skins being such that a 9 mm thick laminate consisting of an inner layer having said inner layer composition interposed between two skins each about 1.5 mm thick and having said skin composition can be wrapped around a 25.4 mm diameter pipe without tearing or splitting.

2. A radiation-shielding element as claimed in claim 1 wherein the silicon elastomer is selected from the class of silicones employed for the production of molds.

3. A radiation-shielding element as claimed in claim 1 wherein the plastic material comprises silicone elastomer.

4. A radiation-shielding element as claimed in claim 1 wherein the inner layer comprises plastic material filled with lead particles.

5. A radiation-shielding element as claimed in claim 4 wherein the particles form 75 to 95% by weight of the inner layer.

6. A radiation-shielding element as claimed in claim 1 wherein at least some of the edges of the laminate are clad with silicone.

7. A radiation-shielding element as claimed in claim 1 wherein the skins are each 1 mm to 2 mm thick.

8. A radiation-shielding element as claimed in claim 1 wherein the silicone elastomer of the flexible skins exhibits surface tackiness.

9. A radiation-shielding element as claimed in claim 8 wherein at least some of the edges of the laminate are clad with silicone.

10. A radiation-shielding element as claimed in claim 1 wherein the plastic material of the inner layer comprises silicone elastomer and the particles comprise lead.

* * * * *